F. P. HUTCHINSON.

Improvement in Adjustable Shackle for Tightening Carriage-Springs.

No. 128,399.          Patented June 25, 1872.

Witnesses.

UNITED STATES PATENT OFFICE.

BENJAMIN PANCOAST, OF MANCHESTER, NEW HAMPSHIRE, ADMINISTRATOR OF THE ESTATE OF FRANCIS PORTER HUTCHINSON, DECEASED.

IMPROVEMENT IN ADJUSTABLE SHACKLES FOR TIGHTENING CARRIAGE-SPRINGS.

Specification forming part of Letters Patent No. 128,399, dated June 25, 1872.

*To all whom it may concern:*

Be it known that FRANCIS PORTER HUTCHINSON, of Manchester, in the county of Hillsborough and State of New Hampshire, did, in his lifetime, invent certain new and useful Improvements in Devices for Tightening Carriage-Springs, and for other purposes; and I do hereby declare the following description and accompanying drawing are sufficient to enable any person skilled in the art or science to which it most nearly appertains to make and use his said invention or improvements without further invention or experiment.

The nature of this invention consists in the particular construction, combination, and arrangement of devices forming the improved tightener for carriage-springs and other purposes, described in the following specification and represented in the accompanying drawing, in which drawing—

Figure 1:
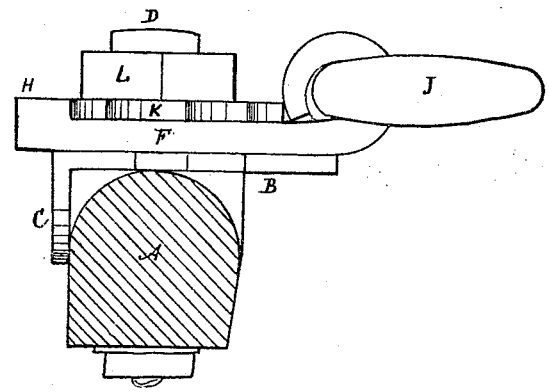
Figure 2:
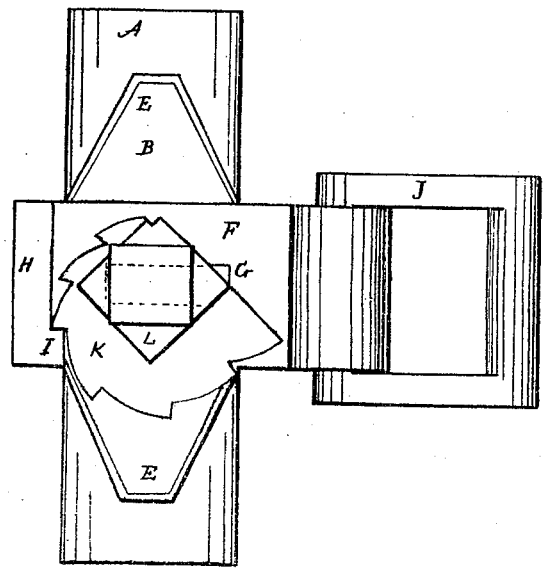

Figure 1 is a side elevation, and Fig. 2 a top view.

In the drawing, A is the rear axle or stock, or it may be the end of the rocker. B is a metal plate fitted to the top of the axle or stock, provided with a flange, C, projecting down on the rear side of the axle, and a hole for the bolt D. This plate B may be made to extend in each direction on the axle or stock A, as shown at E E. F is a stand or slide, made of wrought or other metal, and provided with a slot, G, shown by dotted lines in Fig. 2. The rear end of this slide has a rib or flange, H, on it, with a lug or stop, I, at one end. The front end of the slide F is turned over and embraces one end of the link J, as shown in the drawing. The other end of this link is to receive the end of the spring or other thing to be tightened. K is a ratchet-cam, made in the form shown in Fig. 2, flat on the under side to fit the slide F, with a square hub, L, on the top for the wrench which is to turn it, and a hole through it for the bolt D, on which it turns. This ratchet-cam K is provided with a series of teeth, which catch against the stop I on the flange H of the slide F, so that by loosening the bolt D and turning the cam K to the right it will force the slide F back and tighten the spring; or by turning the cam to the left the spring may be loosened. The stop I on the slide prevents the cam from turning so as to hold the slide in place. The bolt D passes down through the cam K, slide F, plate B, and axle A, and is fastened with a nut at its lower end. The rib H and stop I acting against the cam prevent the slide from slipping when pulled by the spring attached to the link J of the slide.

This cam is intended to be used for such purposes as it may be usefully applied.

Having described the foregoing invention, what I claim, as the invention of the late FRANCIS PORTER HUTCHINSON, is—

1. In combination with the slide F provided with a stop, I, the ratchet-cam K, constructed and arranged substantially as described, for the purpose set forth.

2. And in combination with the ratchet-cam K I claim the square hub L on the side of the cam for the purpose of turning it, substantially as described.

BENJ. PANCOAST,
*Administrator of the estate of*
*Francis Porter Hutchinson.*

Witnesses:
JOSEPH B. CLARK,
NATHL. E. MORRILL.